United States Patent
Han et al.

(10) Patent No.: US 11,047,462 B1
(45) Date of Patent: Jun. 29, 2021

(54) INTEGRATED TORQUE CONVERTER ASSEMBLY

(71) Applicant: Schaeffler Technologies AG & Co. KG, Herzogenaurach (DE)

(72) Inventors: Zipeng Han, Akron, OH (US); Peter Rentfrow, Doylestown, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/876,587

(22) Filed: May 18, 2020

(51) Int. Cl.
*F16H 45/02* (2006.01)
*F16D 13/52* (2006.01)

(52) U.S. Cl.
CPC .............. *F16H 45/02* (2013.01); *F16D 13/52* (2013.01); *F16D 2200/0021* (2013.01); *F16H 2045/0284* (2013.01)

(58) Field of Classification Search
CPC ................ F16H 45/02; F16H 45/0284; F16H 2045/0205; F16D 13/52; F16D 2200/0021
See application file for complete search history.

(56) References Cited

U.S. PATENT DOCUMENTS

| | | | | |
|---|---|---|---|---|
| 3,041,892 | A * | 7/1962 | Schjolin | F16H 45/02 475/48 |
| 9,353,844 | B2 * | 5/2016 | Frary | F16H 45/02 |
| 9,523,420 | B2 * | 12/2016 | Depraete | F16H 45/02 |
| 2007/0074943 | A1 * | 4/2007 | Hemphill | F16H 45/02 192/3.25 |
| 2017/0307056 | A1 * | 10/2017 | Verhoog | F16H 45/02 |
| 2018/0363749 | A1 * | 12/2018 | Cai | F16F 15/123 |

* cited by examiner

*Primary Examiner* — Charles A Fox
*Assistant Examiner* — Farhana Pervin
(74) *Attorney, Agent, or Firm* — Volpe Koenig

(57) ABSTRACT

A compact integrated torque converter assembly is disclosed herein. The integrated torque converter assembly includes a clutch assembly that is integrated with a core ring arrangement. Based on this arrangement, the clutch assembly is positioned inside of the torus and radially inward from a radially outward periphery of the pump and the turbine.

8 Claims, 3 Drawing Sheets

INTEGRATED TORQUE CONVERTER ASSEMBLY

FIELD OF INVENTION

The present disclosure relates to a torque converter, and more specifically relates to an integrated torque converter.

BACKGROUND

Torque converters are well known. One type of torque converter is an integrated torque converter in which a clutch assembly is integrated into the hydraulic circuit of the turbine. One such integrated torque converter assembly 1 is illustrated in FIG. 1. As shown in FIG. 1, the clutch assembly 5 is positioned between two radially outward flanges of the pump 2 and the turbine 3. These types of arrangements are efficient and reduce the overall axial size of the torque converter. These arrangements also ensure sufficient transmission due to the relatively larger radius of the clutch assembly 5. However, these arrangements increase the requisite radial space of the torque converter due to the position of the clutch assembly 5.

As there is an increasing consumer demand for electric motors, it is important to reduce the entire footprint or envelope of the torque converter, including the radial and axial directions. It would be desirable to provide an integrated torque converter that has a relatively small footprint that also provides sufficient torque transmission.

SUMMARY

A compact integrated torque converter assembly is disclosed herein. The integrated torque converter assembly includes a clutch assembly that is integrated with the core ring arrangement. Based on this arrangement, the clutch assembly is positioned inside of the torus and radially inward from a radially outward periphery of the pump and the turbine. This configuration reduces the overall radial size of the integrated torque converter assembly.

In one embodiment, the clutch assembly includes a plurality of friction plates. The clutch assembly can further include a pair of clutch plates connected to a first axially extending flange of the core ring arrangement, and a separator plate connected to a second axially extending flange of the core ring arrangement. The plurality of friction plates are arranged between the pair of clutch plates and the separator plate.

In one embodiment, the pair of clutch plates are connected to the first axially extending flange via a first splined connection, and the separator plate is connected to the second axially extending flange via a second splined connection.

In one embodiment, the torque converter includes a three-passage (F1, F2, F3) hydraulic fluid arrangement, including an inlet passage (F1), an outlet passage (F2), and a control passage (F3). The control passage (F3) provides hydraulic fluid directly to an axial outer surface of the turbine to control the clutch assembly.

In one embodiment, a seal is arranged between a radially outer surface of the turbine and a radially inner surface of the pump.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
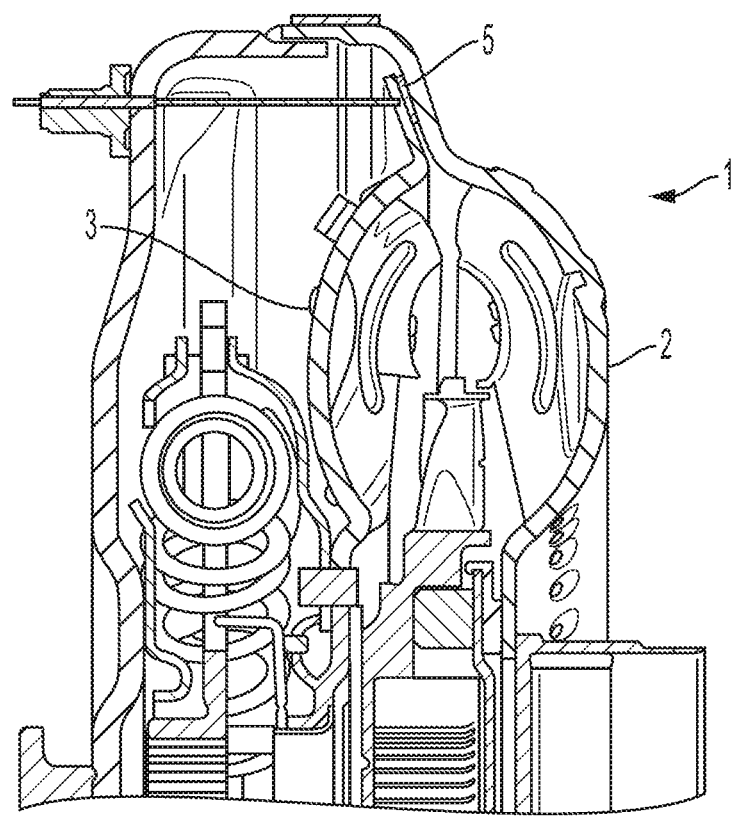
FIG. 1 is a side cross-sectional view of an integrated torque converter according to the prior art.
Figure 2:
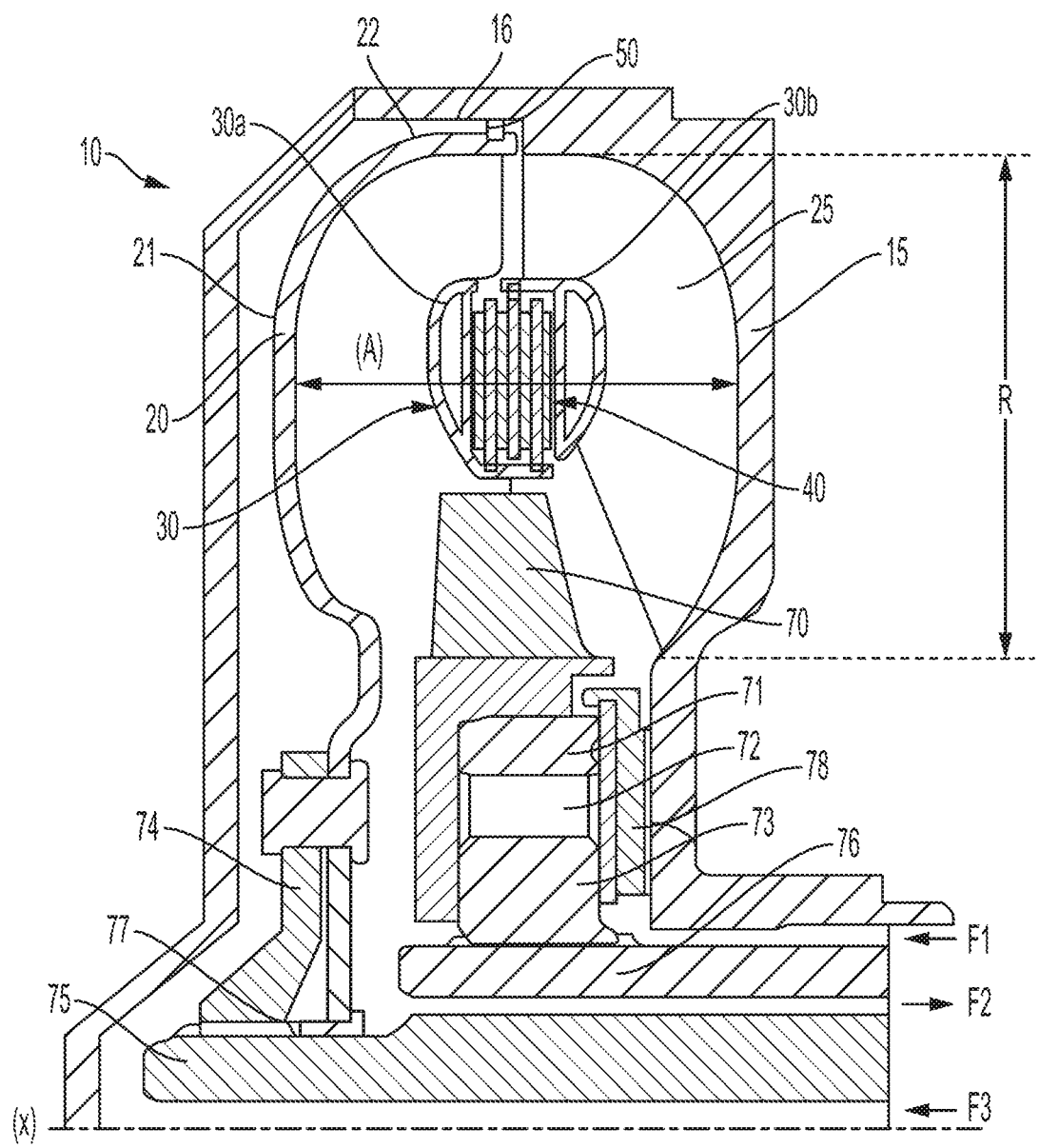
FIG. 2 is a side cross-sectional view of a torque converter assembly according to an embodiment.

An integrated torque converter assembly 10 is illustrated in FIG. 2. The assembly 10 includes a pump 15 and a turbine 20 arranged adjacent to each other to define a torus 25. A core ring arrangement 30, having a first core ring half 30a on the turbine 20 side and a second core ring half 30b on the pump 15 side, is also arranged within the torus 25. One of ordinary skill in the art would understand that the configuration of the core ring arrangement 30 can vary, depending on the specific requirements of the torque converter.

As shown in FIG. 2, a stator casing 70 is supported by a bearing assembly including an outer race 71, rolling elements 72, and an inner race 73. The bearing assembly is supported on a stator shaft 76 in a radial direction. A washer 78 is arranged axially between the bearing assembly and the pump 15. On the turbine 20 side, a flange 74 connects the turbine 20 to the transmission input shaft 75.

A clutch assembly 40 is supported by the core ring arrangement 30 and is arranged within the torus 25. The clutch assembly 40 is positioned radially inward from a radially outward periphery of the pump 15 and the turbine 20. A radial extent (R) and an axial extent (A) of the torus 25 is illustrated in FIG. 2. As shown in FIG. 2, the clutch assembly 40 overlaps with a medial region of both the radial extent (R) and the axial extent (A) of the torus 25. In other words, the clutch assembly 40 overlaps with an axial and radial mid-point of the torus 25. One of ordinary skill in the art would understand based on this disclosure that the exact position of the clutch assembly 40 within the torus 25 can be modified.

In one embodiment, the clutch assembly 40 includes a plurality of friction plates 42a-42d, clutch plates 44a, 44b, and a separator plate 46. One of ordinary skill in the art would understand based on this disclosure that any arrangement of the clutch assembly 40 can be provided, including any number of friction or clamping elements. Due to the clutch assembly 40 being positioned radially inward relative to existing integrated torque converters, the clutch assembly 40 inherently would provide a lower torque transmission capacity. The multi-clutch configuration of the clutch assembly 40 ensures sufficient torque transmission.

Figure 3:
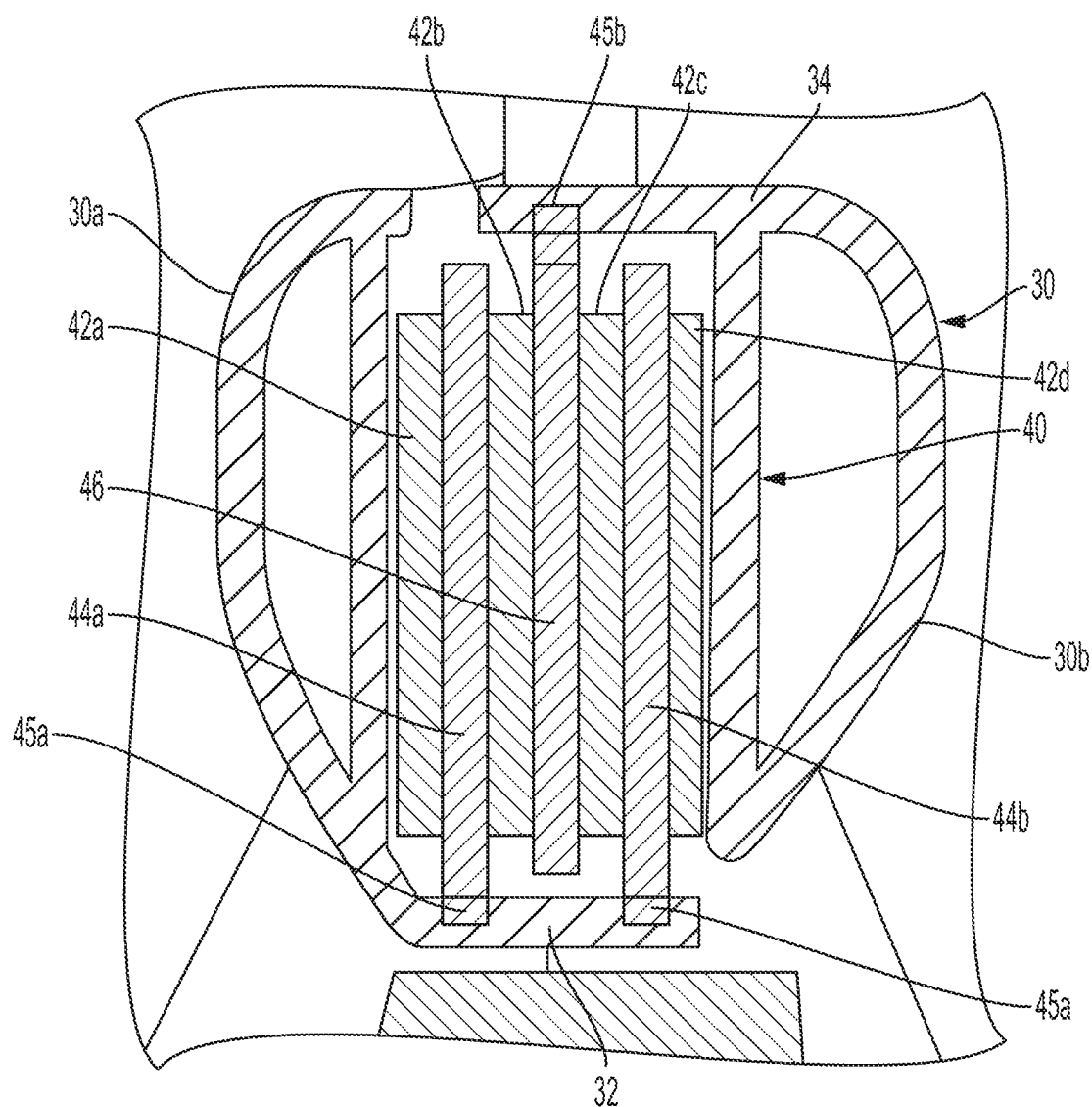
FIG. 3 is a magnified side cross-sectional view of a clutch assembly and core ring arrangement of the torque converter assembly of FIG. 2.

As shown more clearly in FIG. 3, the pair of clutch plates 44a, 44b are connected to a first axially extending flange 32 of the core ring arrangement 30 (more specifically the first core ring half 30a), and the separator plate 46 is connected to a second axially extending flange 34 of the core ring arrangement 30 (more specifically the second core ring half 30b). The plurality of friction plates 42a-42d are arranged between the pair of the clutch plates 44a, 44b and the separator plate 46. In one embodiment the axially extending flanges 32, 34 extend parallel to each other and parallel to the rotational axis (X). The axially extending flanges 32, 34 overlap each other in a radially extending plane from the rotational axis (X).

The core ring arrangement 30, and more specifically, the axially extending flanges 32, 34, can include connection elements for the friction components. In one embodiment, the pair of clutch plates 44a, 44b are connected to the first axially extending flange 32 via a first splined connection 45a, and the separator plate 46 is connected to the second axially extending flange 34 via a second splined connection 45b. One of ordinary skill in the art would understand based on this disclosure that other connections or spline configurations can be provided.

In one embodiment, the torque converter 10 includes a three-passage (F1, F2, F3) hydraulic fluid arrangement. This three-passage hydraulic fluid arrangement includes an inlet passage (F1), an outlet passage (F2), and a control passage (F3). In one embodiment, the control passage (F3) provides hydraulic fluid directly to an axial outer surface 21 of the turbine 20. One of ordinary skill in the art would understand based on this disclosure that the control passage (F3) can be configured to engage other portions of the assembly 10. Additionally, other hydraulic fluid circuit arrangements may be used.

As shown in FIG. 2, a seal 50 is arranged between a radially outer surface 22 of the turbine 20 and a radially inner surface 16 of the pump 15. The seal 50 separates the control passage (F3) from the torus 25. The specific location of the seal 50 can be modified. In one embodiment, the seal 50 can be an axial seal.

Because the core ring arrangement 30 is supporting the clutch assembly 40, the core ring arrangement 30 can be formed from a more durable material than core rings according to existing arrangements. In one embodiment, the core ring arrangement 30 is formed from stamped steel.

By arranging the clutch assembly 40 within the torus 25, the clutch assembly 40 has an improved thermal dissipation capability due to the hydraulic fluid being supplied to the torus 25. This improves the efficiency, reliability, and durability of the clutch assembly 40.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS torque converter assembly 1
pump 2
turbine 3
clutch assembly 5
torque converter assembly 10
pump 15
radially inner surface 16 of the pump
turbine 20
axial outer surface 21 of the turbine 20
radially outer surface 22 of the turbine
torus 25
core ring arrangement 30
first core ring half 30a
second core ring half 30b
first axially extending flange 32
second axially extending flange 34
clutch assembly 40
friction plates 42a-42d
clutch plates 44a, 44b
splined connection 45a, 45b
separator plate 46
stator casing 70
outer race 71
rolling element 72
inner race 73
flange 74
transmission input shaft 75
stator shaft 76
bushing 77
washer 78
inlet passage (F1)
an outlet passage (F2)
control passage (F3)
axis (X)

What is claimed is:

1. An integrated torque converter assembly comprising:
a pump and a turbine arranged adjacent to each other to define a torus;
a core ring arrangement positioned within the torus;
a clutch assembly supported by the core ring arrangement;
a three-passage hydraulic fluid arrangement including: an inlet passage; an outlet passage; and a control passage, the control passage providing hydraulic fluid directly to an axial outer surface of the turbine; and
a seal always contacting a radially outer surface of the turbine and a radially inner surface of the pump such that the seal separates the control passage from the clutch assembly and the torus.

2. The integrated torque converter assembly of claim 1, wherein the clutch assembly includes a plurality of friction plates.

3. The integrated torque converter assembly of claim 2, wherein the clutch assembly further includes a pair of clutch plates connected to a first axially extending flange of a first core ring half of the core ring arrangement, and a separator plate connected to a second axially extending flange of a second core ring half of the core ring arrangement, wherein the plurality of friction plates are arranged between the pair of the clutch plates and the separator plate.

4. The integrated torque converter assembly of claim 3, wherein the pair of clutch plates are connected to the first axially extending flange via a first splined connection, and the separator plate is connected to the second axially extending flange via a second splined connection.

5. The integrated torque converter assembly of claim 1, wherein the clutch assembly is positioned radially inward from a radially outward periphery of the pump and the turbine.

6. The integrated torque converter assembly of claim 1, wherein the core ring arrangement is formed from stamped steel.

7. The integrated torque converter assembly of claim 1, wherein the clutch assembly overlaps with a medial region of the torus in both an axial direction and a radial direction.

8. The integrated torque converter assembly of claim 1, wherein the control passage includes a portion that is defined radially inward from the inlet passage and the outlet passage.

* * * * *